United States Patent [19]

Bondley

[11] 3,881,038

[45] Apr. 29, 1975

[54] LOW TEMPERATURE METALLIZATION OF FERRITE

[75] Inventor: Ralph J. Bondley, Scotia, N.Y.

[73] Assignee: The United States of America as represented by the United States Atomic Energy Commission, Washington, D.C.

[22] Filed: May 7, 1974

[21] Appl. No.: 467,682

[52] U.S. Cl. .................. 427/156; 427/374; 427/123
[51] Int. Cl. .............................. B44d 1/16; B44d 1/18
[58] Field of Search ......... 117/71 M, 227, 217, 201, 117/107; 148/6.0, 6.3

[56] References Cited

UNITED STATES PATENTS

| | | | |
|---|---|---|---|
| 2,856,312 | 10/1958 | Nowak et al. | 148/6.3 |
| 3,297,416 | 1/1967 | Ranson et al. | 117/71 M |

*Primary Examiner*—Cameron K. Weiffenbach
*Assistant Examiner*—Ralph E. Varndell
*Attorney, Agent, or Firm*—Dean E. Carlson; Arthur A. Churm; Paul A. Gottlieb

[57] ABSTRACT

A method is provided for metallizing a ferrite at low temperatures. The method includes depositing a layer of lead on the ferrite, coating the lead layer with titanium hydride, distributing lead solder upon the titanium hydride, heating the ferrite until the lead solder flows uniformly over the lead layer, and slowly cooling the ferrite.

10 Claims, 1 Drawing Figure

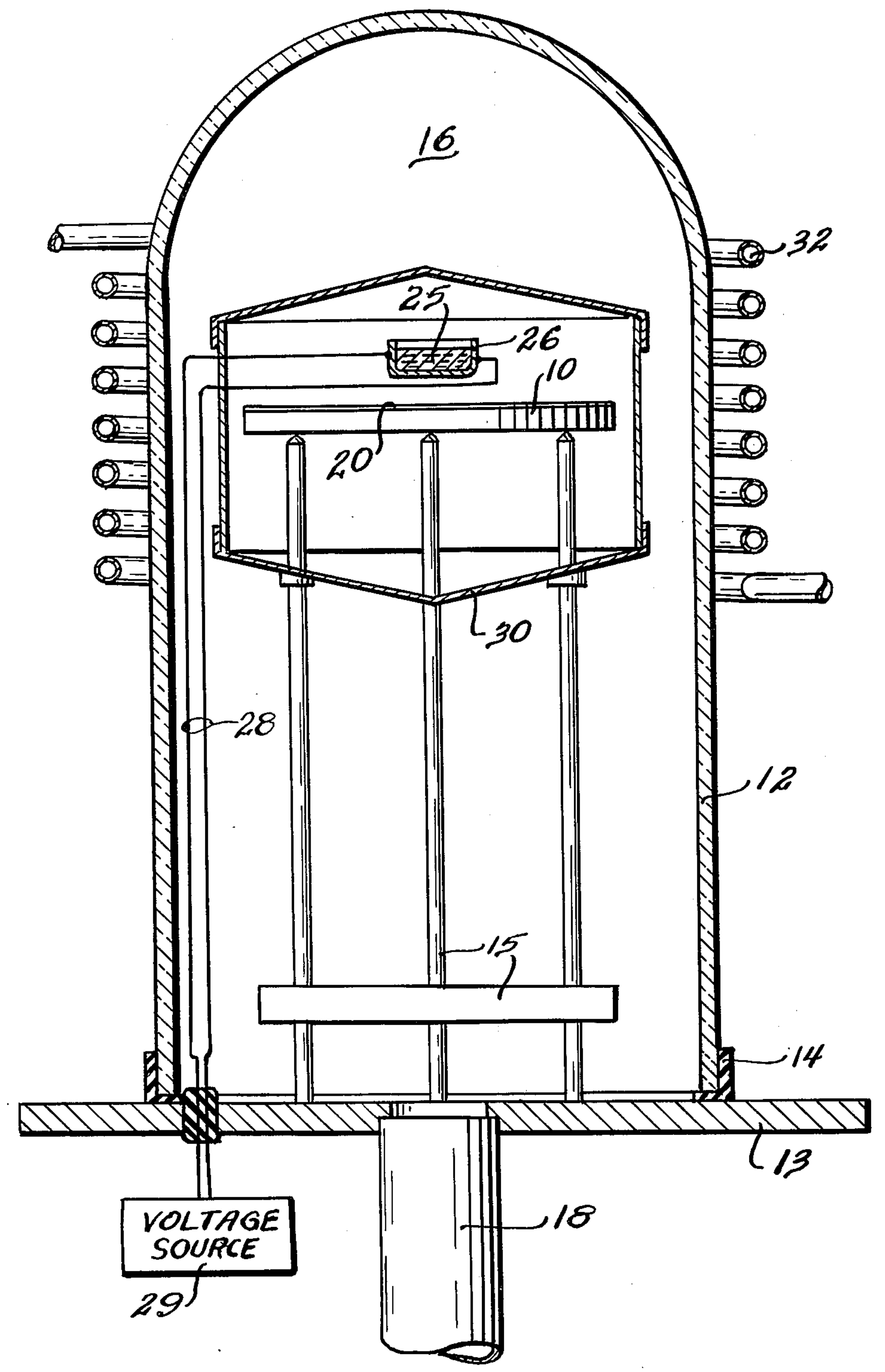
16
32
25
26
10
20
30
28
12
15
14
13
18
VOLTAGE SOURCE
29

LOW TEMPERATURE METALLIZATION OF FERRITE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

To allow ferrite objects to be soldered to other metal objects, it is necessary to bond a metal surface to the ferrite as the ferrite itself has insufficient structural strength and wetting to support such soldering. The metal surface, because of its bonding to the ferrite, will provide structural support to allow soldering to another metal object. For example, ferrite plates used in microwave resonant cavities and wave guides for mode dampening must be soldered to metal cooling pipes because of the high heat developed in the ferrite during high power operation. Ferrite plates suitable for such mode dampening are not structurally strong enough to allow soldering to the cooling pipe. Also, during high power operation, an arc may tend to appear between the ferrite plates and the pipe unless there is a proper conducting medium therebetween. It is therefore necessary to provide a metallized surface on one portion of the ferrite plates to allow the plates to be soldered to a metal cooling pipe. A similar process is the metallizing of ceramic plates to allow them to be soldered to cooling pipes. It has been found, however, that the present processes for metallizing ceramics involve temperatures too high for metallizing ferrites. At the normal temperatures used in metallizing ceramics according to the known processes, the crystal structure of the ferrite would break down.

It is therefore an object of this invention to provide a method for metallizing ferrite objects.

Another object of this invention is to provide a method for metallizing ferrite objects at low temperatures to avoid structural damage to the ferrite.

SUMMARY OF THE INVENTION

A method is provided for establishing a metal surface on a ferrite at a temperature which will not destroy the ferrite. The metal surface is sufficient to allow soldering of the metal surface to another metal object. The method includes depositing a layer of lead on the surface of the ferrite to be metallized under a vacuum condition by evaporation of the lead onto the ferrite, coating the lead surface with a slurry of titanium hydride in alcohol, distributing powdered lead base solder over the hydride in the presence of a vacuum, heating the ferrite to approximately 500°C. until the lead solder flows uniformly over the lead layer, and slowly cooling the ferrite to avoid destroying the desired ferrite crystal structure.

BRIEF DESCRIPTION OF THE DRAWING

The drawing is of an apparatus which may be used to practice the process herein disclosed.

DETAILED DESCRIPTION OF THE EMBODIMENT

In order to establish a metal surface on a ferrite object, such as an object in the form of a plate, at a temperature which will not destroy the ferrite crystal structure, a process is provided which does not involve temperatures at which damage to the desired crystal structure of the ferrite will occur. For a ferrite to be used for mode damping in a resonant cavity where it must support high magnetic fields from RF energy, this temperature is approximately 500°C. Therefore, during the metallizing process of such a ferrite, all steps of the process must involve temperatures which do not exceed 500°C. While for each different type of ferrite and ferrite crystal structures there may be a different temperature at which damage to the ferrite may occur, the disclosed method provides sufficient flexibility to be adaptable for the metallization of different types of ferrite crystal structures with different temperatures at which damage occurs.

Referring to the drawing there is shown an apparatus which may be used to practice the disclosed process. The ferrite object to be metallized, such as ferrite plate 10, is placed in a chamber which is capable of being evacuated. For example, in the drawing the chamber includes bell jar 12 standing on base 13 with sealing provided by gasket 14. A stand 15 is provided upon which plate 10 may be placed allowing full exposure of the surface 20 of plate 10 to be metallized. The chamber 16 thus formed may be evacuated via tube 18 which couples chamber 16 to a vacuum pumping system (not shown).

The first step in the process is to deposit a layer of lead on exposed surface 20 of plate 10. This may be accomplished by vapor deposition. A source 25 of lead is provided within the chamber. This source 25 of lead may be contained in a boat or crucible 26 positioned within chamber 16 by means not shown. The boat 26 should be of a material such as molybdenum which will withstand the temperatures necessary for the evaporation of the lead from source 25. The heating of boat 26 to evaporate lead from source 25 may be achieved by a variety of well known methods such as by resistance heating which may be accomplished by coupling a shunt 28 to boat 26, and supplying electrical energy from a power source 29 to shunt 28. Before the heating begins, chamber 16 should be evacuated so that minimal contaminants are present during the evaporation and deposition of the lead. A pressure of approximately $10^{-4}$ Torr or less is satisfactory. Under this pressure condition, the lead source is heated until lead is evaporated, depositing a layer of lead on exposed surface 20 to be metallized.

After the layer of lead has been deposited on surface 20, the plate may be removed from chamber 16 and a layer of titanium hydride is applied over the deposited layer of lead. This may be done by coating the lead layer with a slurry of titanium hydride in a liquid. The slurry form of the titanium hydride is preferred so that the hydride may be uniformly applied over the lead layer. The slurry is obtained by mixing powdered titanium hydride with a liquid until it is of a consistency sufficient to allow its application over the lead layer by means such as with a brush. The liquid should be a fast drying substance, nonreactive with the lead or titanium and must be easily evaporated when subjected to heat leaving no residue. Examples of suitable fast drying liquids are alcohol, acetone, and acetate. A slurry containing about 10 grams of hydride in about 25 cc of alcohol was found to be satisfactory. The slurry may be painted over the lead layer so that a uniform coating without any bare spots is obtained. The thickness of the coating is not critical so long as there are no bare spots.

Any other method of application of titanium hydride which insures this uniformity of coating is appropriate for this process.

Over the titanium hydride is then distributed a lead or lead alloy solder. Generally, the solder is in bit form, small enough so that it may be sprinkled uniformly over the hydride, but large enough to remain in place during handling.

Pure lead solder may be used, but it is difficult to work with during the process because of its high melting temperature and fast solidifying rate after melting, necessitating a hurried work technique. Because of the need to metallize the ferrite at relatively low temperatures to preserve the ferrite crystal structure a solder with reduced melting point, less than pure lead is desirable. A lead alloy solder having a melting point depending upon the amount of material alloyed with the lead provides the necessary flexibility to practice the disclosed method. Examples of materials which alloyed with lead reduce the melting point of the resulting alloy to a desired point are indium, silver and tin. In addition, the alloy solder should also promote wetting of the solder so when it is exposed to sufficient heat the solder will liquefy and flow uniformly over the surface of the lead layer, the alloy solder should insure a stainless solder, that is, a solder which will resist oxidation of the lead and it should promote aging in that the amount of time with which you may handle the solder in air before it begins to unduly oxidize is increased. A lead-indium solder is believed to best satisfy these conditions. As much as a 50 percent by weight lead and 50 percent by weight indium solder is usable, with the preferred composition for a ferrite which cannot be heated above 500°C. being 90 percent by weight lead and 10 percent by weight indium.

The ferrite plate 10 is now returned to chamber 16 and repositioned on stand 15. The plate is to be heated at a temperature at which the titanium hydride decomposes. At this temperature the hydride will clean the surface of the lead layer and the solder will uniformly flow over the entire surface of the lead layer.

The decomposition of titanium hydride will result in the giving off of hydrogen gas. This hydrogen gas is a potent reducing agent which will readily react with any contaminants in the chamber or on plate 10. This effectively cleans the environment about the ferrite because the resulting gases can be removed by the vacuum system. In addition, because of the large volume of the hydrogen gas produced, other gases which may be present or generated by the heating are swept along by the hydrogen gas out through the vacuum system. The rate at which these gases can be removed governs the rate at which the heating can be done, since the less contaminants present during the melting of the solder and the decomposition of the hydride, the less likely the presence of impurities in the final metallized layer. The presence of impurities in the metallized layer might seriously affect the strength of the metal-to-ferrite bond.

Heating at controlled rates may be accomplished by any of several well-known means. One method is to position the ferrite within a susceptor 30, a hollow metal container. A water-cooled induction coil 32 is positioned about bell jar 12 so that when oscillatory electrical energy is supplied to the coil, the currents in the coil induce a current in the metal container 30. The container then radiates energy which will heat plate 10 to the desired temperature. A titanium container 30 provides best results because it is easily heated by induced currents and also because titanium is a powerful adsorber or getter which aids in the removal of contaminants during the heating.

For a ferrite plate to be used in mode damping the desired crystal structure is preserved below 500°C. Therefore, the heating of such a plate having such a desired crystal structure should be to no more than 500°C. For other crystal structure this temperature varies according to well-known temperature characteristics of the ferrite crystal structure. With the heating to 500°C. the titanium hydride decomposes and the solder flows uniformly over surface 20. The proper rate for the removal of the gases to allow heating at 500°C. is achieved with a pressure of about $10^{-2}$ Torr.

When the uniform covering of surface 20 with solder has occurred, the heat is then removed and the part is allowed to cool in the vacuum to prevent contamination while cooling. The time of cooling is also determined by the particular crystal structure of the ferrite. For example, for a metallized plate to be used in mode damping where the electrical properties of the ferrite must be preserved, 10 hours is the minimum cooling time. For other types of ferrite crystal structure, the cooling time may vary according to the well-known stability characteristics of each particular crystal structure.

The resulting metallized surface of the ferrite will be sufficiently strong to allow soldering of the metallized surface to other objects. The structure of metallized layer from the exposed surface to the ferrite will consist of the following overlapping layers: a lead layer at the exposed surface, a titanium and lead layer, a titanium and ferrite layer, and the ferrite. The titanium forms a bridge bond between the outer lead layer and the inner ferrite. This bonding between the ferrite and the metallized layer by the titanium, further adds to the strength of the bond of the metallized layer to the ferrite. Note that, if a lead alloy is used as a solder, then the layers previously mentioned having lead would instead be of the lead alloy.

Selection of the type of ferrite to be metallized is determined by the physical properties desired. Where the application is for cavities and wave guides, for example, a ferrite having low resistance at the operating frequency but high resistance at other frequencies is desirable. This type of ferrite has a particular temperature, about 500°C., at which the crystal structure begins to become damaged. The process is then adapted so that this temperature is not exceeded. Using the lead-indium solder, this may be done by varying the amount of indium in the lead-indium alloy so that the melting point of the solder will fall below the 500°C. temperature. For other desired types of ferrite crystal structure, this temperature at which damage to the crystal structure may occur varies and is well known. To practice the process one need only vary the amount of indium in the lead indium solder, thereby varying the resulting temperature at which the solder will melt, to adapt the process to other types of ferrite crystal structures. In addition, the type of ferrite and its use will also affect the cooling time after the solder has been made to flow uniformly over the surface. This can be also determined by the well known features of the particular crystal structure.

The resulting metallized layer will be of sufficient metallurgical properties and electrical properties to allow the soldering of the surface to other metal objects such as cooling tubes. In addition, this metallized layer will provide a conductive path between the ferrite and the cooling tubes so that under high power RF operating conditions arcing will not occur between the ferrite and the cooling tubes.

The embodiments of the invention in which an exclusive property or privilege is claimed are defined as follows:

1. A method for metallizing a ferrite surface having a particular crystal structure which will become damaged when a particular temperature is exceeded, including the steps of:

a. depositing a layer of lead upon said ferrite surface;
b. coating said lead layer with titanium hydride;
c. distributing upon said titanium hydride a solder having lead and having a melting point below that particular temperature at which damage to the particular crystal structure will occur;
d. heating said ferrite surface until said titanium hydride decomposes to clean said lead layer of the ferrite surface and until said solder flows uniformly over said lead layer; and
e. cooling said ferrite surface for a time period sufficient to maintain the particular crystal structure for said ferrite surface.

2. The method of claim 1, wherein said depositing a layer of lead occurs with the pressure of the environment surrounding the surface being at least $10^{-4}$ Torr.

3. The method of claim 1, wherein said heating and said cooling the ferrite surface occurs with the pressure of the environment surrounding the surface being at least $10^{-2}$ Torr.

4. The method of claim 1, wherein said titanium hydride is in the form of a slurry of titanium hydride in alcohol of sufficient consistency to allow said slurry to be painted upon said ferrite surface.

5. The method of claim 4, wherein said slurry is formed of 10 grams of powdered titanium hydride in 25 cc of alcohol.

6. The method of claim 1 wherein said solder is in the form of an alloy of lead and at least one material chosen from the group consisting of indium, silver and tin.

7. The method of claim 6, wherein said solder having lead is in the form of a lead-indium alloy solder.

8. The method of claim 7, wherein said lead-indium alloy solder has at least 50 percent by weight lead.

9. The method of claim 6, wherein said lead-indium alloy solder is 90 percent by weight lead and 10 percent by weight indium.

10. The method of claim 9, wherein the ferrite surface has a particular crystal structure capable of use in a high-frequency environment with the particular temperature at which damage to the crystal structure occurs being approximately 500°C., and wherein said cooling said ferrite surface being for a time period of approximately 10 hours.

* * * * *